June 6, 1967  O. S. LUTES  3,323,371
SUPERCONDUCTIVE TRANSDUCER
Filed Nov. 14, 1963

INVENTOR.
OLIN S. LUTES
BY Robert O. Vidas
ATTORNEY

United States Patent Office 3,323,371
Patented June 6, 1967

3,323,371
SUPERCONDUCTIVE TRANSDUCER
Olin S. Lutes, Minnetonka, Minn., assignor to
Honeywell Inc., a corporation of Delaware
Filed Nov. 14, 1963, Ser. No. 323,630
7 Claims. (Cl. 73—517)

This invention is related to superconductive pressure transducer devices generally. More particularly, it is related to superconductive pressure transducer devices which function as extremely sensitive accelerometers.

The concept of this invention is based on a pressure effect exhibited by superconductors. That is, the superconducting transition temperature is dependent on applied pressure such that an increase in pressure changes the transition temperature of the superconductor. Therefore, a superconductive material held at a predetermined temperature and pressure so as to be maintained in transition between the superconductive and the normal states will undergo a change of resistance and magnetic susceptibility upon a change in pressure applied thereto. Since the change in pressure can be made to depend upon a change in acceleration, the effect may be used to provide an accelerometer. Hereinafter, the term pressure is to be taken to include applied force or strain.

It is an object of this invention to provide a superconductive transducer which is dependent on the piezoresistive-magnetic effect exhibited by superconductors.

It is another object of this invention to provide a transducer in which the working element is a superconductor.

It is another object to provide a transducer in which pressure changes are indicated as changes in the electrical and magnetic properties of a superconductor.

It is still another object to provide a transducer in which changes in pressure applied thereto are indicated as changes in current flow in a superconductor and detected as changes in resistance.

It is yet another object to provide a superconductive transducer in which changes in pressure applied thereto are indicated as changes in the magnetic susceptibility of a superconductor and detected as changes in current in an associated circuit.

Another object is to provide a superconductive transducer in which changes in pressure applied thereto are detected as a change in the magnetic flux of the superconductive element.

It is a further object to provide an accelerometer which is extremely sensitive to low values of acceleration.

These and other objects and advantages of the present invention will be more fully understood by reference to the following description of the invention which is directed to two preferred embodiments of a transducer for use as an accelerometer.

Due to the relatively large change of resistance in comparison to a relatively small change in pressure, superconductive pressure transducers in accordance with this invention are extremely sensitive. For this reason, the preferred embodiments take the form of sensitive accelerometers although the invention is not limited to accelerometers and is applicable to pressure sensitive transducers generally.

Figure 1:
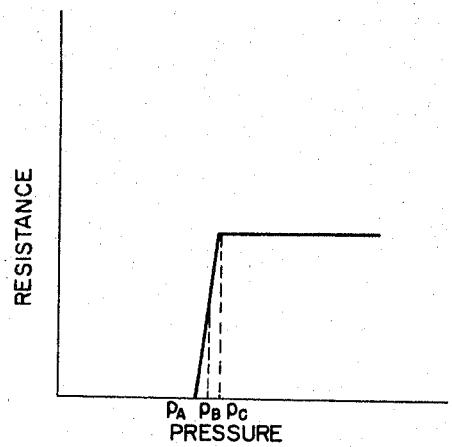
FIGURE 1 is a graph showing the effect of pressure on the resistance of a superconductive element.
Figure 2:
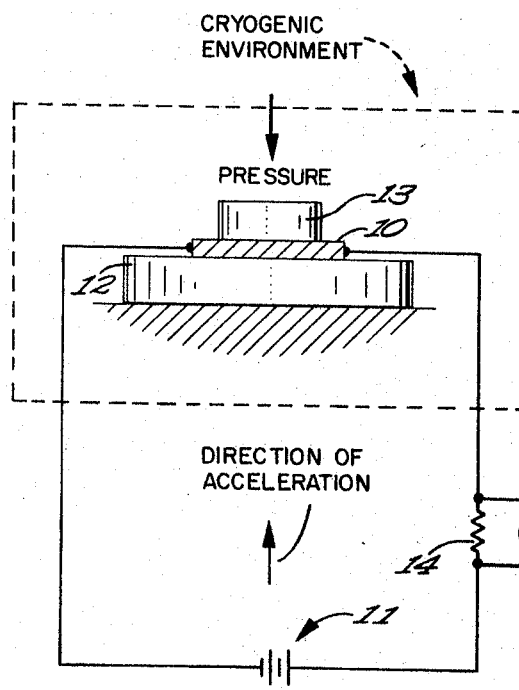
FIGURE 2 is a schematic representation of a first embodiment of the invention which takes the form of an accelerometer.

Referring now to FIGURES 1 and 2, the first embodiment of the invention will be discussed in detail. FIGURE 1 is a graph representing the resistance versus pressure of a superconductor maintained at a transition temperature. It is well known in the art that the transition temperature of a superconductor depends on the particular material and whether or not a magnetic field is applied thereto. For various values of magnetic field the transition temperature has different values. It will be assumed throughout the discussion of FIGURES 1 and 2 that the magnetic field is zero, although the transducer will function if a magnetic field is utilized to obtain a different transition temperature for some desirable reason.

From FIGURE 1 it can be seen that resistance changes with pressure from $P_A$ to $P_C$. This range represents the transition range of the superconductor. Above $P_C$, the superconductor is in the normal state and exhibits no change in resistance with change in pressure for all practical purposes. Below $P_A$, the superconductor is completely in the superconductive state and the resistance is effectively zero for all lower values of pressure. However, between $P_A$ and $P_C$, the superconductor is in transition and is sensitive to pressure changes in terms of resistance. Thus, if a superconductive element is held at a predetermined transition temperature T and pressure $P_B$ (between $P_A$–$P_C$) at a point in transition as indicated, it will undergo a change of resistance with changes in applied pressure.

Such a device may take the form schematically shown in FIGURE 2 where 10 is a superconductive element which is shown connected in a circuit generally designated as 11. Circuit 11 consists of a voltage source, leads contacting superconductor 10 and a fixed resistor 14 across which the output can be measured by a suitable electrical detection means such as a voltmeter connected across resistor 14. The output is dependent upon the resistance of superconductor 10. Superconductive element 10 is mounted on base 12 in a fixed position. Weight means 13 is shown bearing on superconductive element 10 to establish a pressure thereon such as $P_B$. Weight means 13 or other pressure bearing means can be mounted in any suitable manner so as to react with an increase or decrease in applied pressure when acceleration is applied in the direction indicated. For example, the weight could be mounted so as to slide on a rail or the like which is situated perpendicular to superconductor 10.

The entire device or a suitable portion of it is maintained at the proper cryogenic temperature as indicated. Systems which are suitable for such low temperatures are well known in the art. The most popular system usually consists of a liquid helium bath which is maintained at a suitable pressure to obtain the desired temperature in the superconductive range.

From the above description, it can be seen that the resistance change with pressure results in a linear output over a relatively small pressure range. If pressure $P_C$ is exceeded, the resistance ceases to change with pressure and the device becomes a Go-No Go indicator of acceleration.

The basic feature of the invention is that the transducer operates over a relatively small pressure range, but is extremely sensitive in that range although this range can be extended by various geometric or processing means. However, in actual use as an accelerometer, it may be desirable to use the device in conjunction with a wider range, less sensitive accelerometer.

Figure 3:
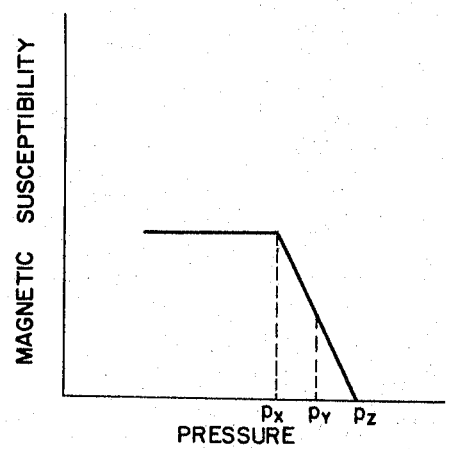
FIGURE 3 is a graph showing the effect of pressure on the magnetic susceptibility of a superconductive element.
Figure 4:
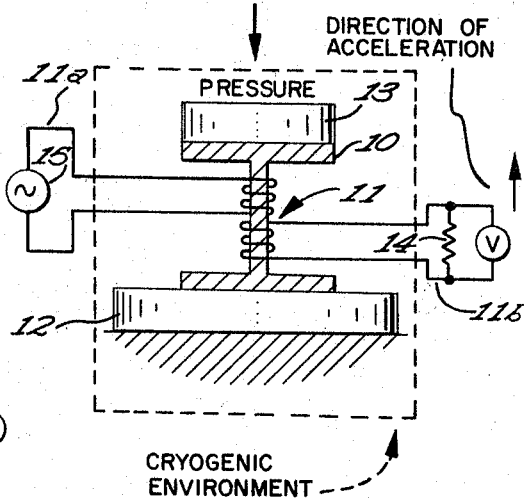
FIGURE 4 is a schematic representation of a second embodiment of the invention which takes the form of an accelerometer.

The pressure effect in the superconductive element may be sensed in another manner. Not only does the resistance of a superconductor change with changes in pressure, but the magnetic susceptibility thereof is also affected. Therefore, the effect can be sensed by an arrangement similar to that utilized in a transformer circuit. FIGURE 4 shows an accelerometer which utilizes this type of design. The curve of FIGURE 3 will be discussed in conjunction with FIGURE 4. From this curve, it can be seen that the magnetic susceptibility of a superconductive element varies with pressure. From $P_X$ to $P_Z$, the superconductive element is in transition between the superconductive and normal states. Above $P_Z$, the element is in the superconductive state and the magnetic susceptibility is constant. Below $P_X$, the superconductor is in the normal state and for practical purposes exhibits no change in magnetic susceptibility with pressure. However, at a predetermined transition temperature T and a pressure $P_Y$ (between $P_X$–$P_Z$) the superconductor is sensitive to variations in pressure in much the same manner as the first embodiment of the device.

FIGURE 4 schematically shows the arrangement necessary for this embodiment of the invention. Elements similar to those of FIGURE 2 are identified by the same numbers. Superconductive element 10 is mounted on base 12 and shown coupled into circuit 11. This circuit consists of two windings arranged around element 10. Superconductive element 10 couples circuit portion 11a to circuit portion 11b in the same manner as the primary and secondary windings of a transformer are coupled to each other by a core to form a circuit. Pressure bearing means such as weight 13, is shown bearing on superconductive element 10.

Again, the device must be maintained at a transition temperature as was the first embodiment of the invention. Hence, the cryogenic environment is shown surrounding the device.

An AC current source 15 creates a constantly changing field in the primary winding of circuit portion 11a. This changing field creates a changing flux in superconductor 10 which in turn creates an AC current in the secondary winding of circuit portion 11b. As the pressure upon element 10 is changed, its magnetic susceptibility is changed leading to a change in the AC component of the current in circuit portion 11b. This variation in current which is due to change in pressure may be detected across resistor 14 by an AC voltmeter although it can also be detected by other known current sensing or flux sensing means. From this discussion it is seen that the use of an alternating current applied through circuit portion 11a results in a continuous readout or magnitude variation in circuit portion 11b with changes in pressure ranging from $P_X$ to $P_Z$.

If a DC current were imposed in place of AC source 15, current change would still occur in circuit portion 11b upon a change of pressure on superconductive element 10. However, the device would merely function as a Go-No Go indicator of change in acceleration rather than continuously indicating changing acceleration. Further, if the DC current were varied by a suitable means, or if a fluxmeter were substituted for the sensing means discussed above, the device will continuously sense changing acceleration when used with DC rather than merely a change in acceleration.

If winding 11b is of a superconductive material as well as element 10, DC current may be utilized to provide a continuous indication of acceleration. In such an embodiment, the initial establishment of a DC current in circuit portion 11a would cause a persistant current in circuit portion 11b since it is superconductive. This current would remain at a steady value until a change in the magnetic susceptibility of element 10, due to acceleration, occurred at which time the persistant current could assume a new value indicative of the new state of acceleration. The persistent current in circuit portion 11b can be detected by any suitable means such as a magnetic probe to measure the field caused by the persistent current.

The sensitivity of the device in all of its embodiments is essentially dependent on three factors:

(1) The mass of weight means 13 and the contact area thereof which is brought to bear on superconductive element 10.

(2) The properties of the superconductive material itself.

(3) The sensitivity of the means used to detect the changes in the properties of the superconductive element.

With reference to the first parameter, the mass and contact area, weight means 13 may be designed as a massive body having a small contact area bearing on superconductive element 10. Such an arrangement would, for example, cause large pressure effects on the superconductor with small changes in acceleration and result in maximum sensitivity. On the other hand, a small mass and large contact area will proportionately lower the sensitivity of the device.

With reference to the second parameter, properties of the superconductive material, it is known that there are two types of superconductors—hard superconductors and soft superconductors both of which exhibit piezoresistive-magnetic effects. Soft superconductors such as tin and lead or hard superconductors such as niobium and niobium-tin operate satisfactorily in accordance with the invention.

With reference to the third parameter, highly sensitive detecting means are known to those skilled in the art which will operate satisfactorily in accordance with this invention.

From the above description of the invention, it is apparent that a new type of pressure transducer and accelerometer is provided. Further, to provide an accelerometer which is sensitive to acceleration from a plurality of directions, the embodiments disclosed herein may be arranged for example in units of three with each unit oriented to sense acceleration from a direction which is perpendicular to that sensed by the other units.

What is claimed is:

1. A superconductive accelerometer comprising:
a superconductive element,
means for holding the superconductive element in a fixed position,
means for maintaining the superconductive element at a predetermined transition temperature,
variable pressure means bearing on the superconductive element for varying the resistance thereof in response to changes in acceleration,
a source of electrical energy,
means connecting a first polarity of the energy source to the superconductive element and
current sensing means connected intermediate a second polarity of the energy source and the superconductive element for detecting changes in resistance of the superconductive element.

2. A superconductive accelerometer comprising:
a first circuit portion including a source of electrical energy and a primary winding,
a second circuit portion including current sensing means and a secondary winding,
a superconductive element magnetically coupling the primary and secondary windings,
means for holding the superconductive element in a fixed position,
means for maintaining the superconductive element at a predetermined transition temperature and
variable pressure means bearing on the superconductive element for varying the magnetic susceptibility thereof in response to changes in acceleration, the variation in susceptibility being detected by the current sensing means as a change in current in the second circuit portion.

3. A superconductive accelerometer comprising:
a superconductive element,
mounting means for holding the superconductive element in a fixed position,
means for maintaining the superconductive element at a predetermined transition temperature, acceleration responsive means bearing on the superconductive element for applying a pressure thereto which is proportional to acceleration, means for causing a current flow in the superconductive element and means for sensing the change in resistance of the superconductive element whereby a change in pressure on the element may be measured as a change in the resistance thereof.

4. A superconductive pressure transducer comprising:
a superconductive element,
means for maintaining the superconductive element at a transition temperature,
means for applying a magnetic field to the superconductive element,
variable pressure means bearing on the superconductive element for varying the magnetic susceptibility thereof and
electrical means for sensing the change in magnetic susceptibility of the superconductive element.

5. A superconductive transducer for converting force to an electrical signal comprising:
a superconductive element adapted to operate in the superconductive temperature range,
means for maintaining the superconductive element at a predetermined transition temperature,
means for causing a current flow in the superconductive element,
means for applying a force to the superconductive element, and
means for sensing the change in resistance of the superconductive element whereby a change in the force applied to the element may be measured as a change in the resistance thereof.

6. A superconductive transducer for converting force to an electrical signal comprising:
a superconductive element,
means for lowering the temperature of the element to a superconductive temperature transition range,
means for applying a force to the element,
means for applying a magnetic field to the superconductive element resulting in the formation of a magentic flux therein and
means for sensing changes in the flux of the superconductive element whereby a change in the force applied to the element may be measured as a change of flux.

7. A superconductive transducer for converting force to an electrical signal comprising:
electrical circuit means including a current source,
a superconductive element in the circuit means adapted to operate in the superconductive temperature range,
means for maintaining the element within a predetermined superconductive temperature transition range,
means for applying force to the element, and
detecting means for detecting current changes in at least a portion of the circuit means due to the effect of a change in the force applied to the superconductive element.

References Cited
UNITED STATES PATENTS

| | | | |
|---|---|---|---|
| 3,168,830 | 2/1965 | Chass | 73—517 X |
| 3,175,405 | 3/1965 | Doyle et al. | 73—517 |

OTHER REFERENCES

An article entitled "Effect of Elastic Strain on the Superconducting Critical Temperature of Evaporated Tin Films" by Blumberg et al. From the Journal of Applied Physics, vol. 33, No. 1, January 1962.

RICHARD C. QUEISSER, *Primary Examiner.*

J. J. GILL, *Assistant Examiner.*